United States Patent [19]
Valsamidis

[11] Patent Number: 5,380,149

[45] Date of Patent: Jan. 10, 1995

[54] WIND TURBINE CROSS WIND MACHINE

[76] Inventor: Michael Valsamidis, 16 Pythagora Street, Pireaus, Greece, 185 33

[21] Appl. No.: 889,899

[22] Filed: May 29, 1992

[30] Foreign Application Priority Data

May 30, 1991 [WO] WIPO ............... PCT/GR91/00007

[51] Int. Cl.⁶ .............................................. F03D 7/06
[52] U.S. Cl. ..................... 415/2.1; 415/4.4; 415/907
[58] Field of Search ............ 415/2.1, 4.1, 4.2, 4.3, 415/4.4, 4.5, 905, 907, 908

[56] References Cited

U.S. PATENT DOCUMENTS

| 75,752 | 3/1868 | Hall | 415/2.1 |
|---|---|---|---|
| 1,036,128 | 8/1912 | Mahoney | 415/2.1 |
| 4,115,027 | 9/1978 | Thomas | 415/4.4 |
| 5,126,584 | 6/1992 | Ouellet | 415/4.2 |

FOREIGN PATENT DOCUMENTS

| 261917 | 6/1926 | Canada | 415/2.1 |
|---|---|---|---|
| 22596 | 7/1921 | France | 415/2.1 |
| 611785 | 10/1926 | France | 415/4.2 |
| 2291379 | 6/1976 | France | 415/2.1 |
| 2448049 | 10/1980 | France | 415/2.1 |
| 867380 | 2/1953 | Germany | 415/2.1 |
| 406661 | 12/1943 | Italy | 415/2.1 |
| 142978 | 11/1980 | Japan | 415/2.1 |
| 17005 | of 1911 | United Kingdom | 415/2.1 |
| 2049066 | 12/1980 | United Kingdom | 415/2.1 |
| 542016 | 3/1977 | U.S.S.R. | 415/2.1 |

Primary Examiner—John T. Kwon
Attorney, Agent, or Firm—Norman B. Rainer

[57] ABSTRACT

A wind turbine cross wind machine is disclosed, which comprises a circumferential arrangement of guide vanes (1) around a centrally located rotor (2) including a central aperture (3) in the middle of a circumferential arrangement of blades (2), where the guide vanes are capable of guiding the wind falling upon counter acting rotor blades towards the direction of rotor rotation, whatever direction the wind may be coming from, thereby offering a substantial improvement in this wind machine efficiency.

Alternatively, the guide vanes (2 in FIG. 7) being of a uniform airfoil type they divert the airstream path by acting like an aerodynamic lens causing a uniform concentration of it within the encircled area, thus producing twin symmetrically convergent airpaths passing through the engine and causing a horizontal venturi effect to appear across the rotor blades with advantageous results on engine performance.

18 Claims, 8 Drawing Sheets

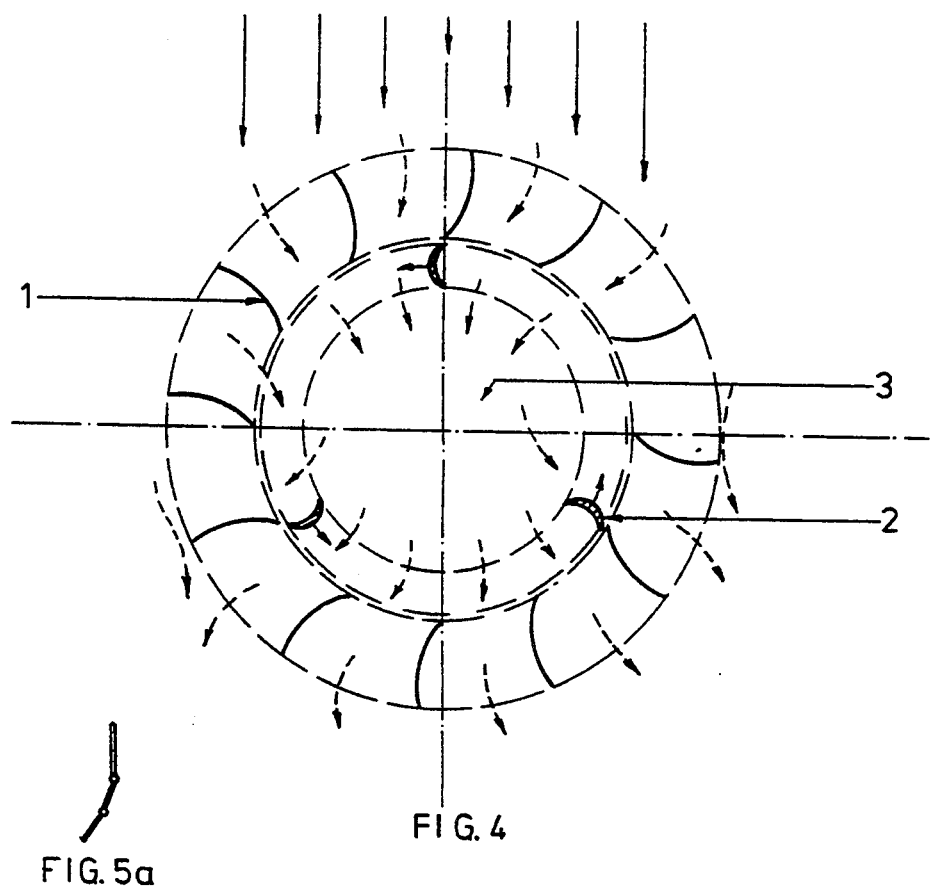
FIG. 5a
FIG. 4
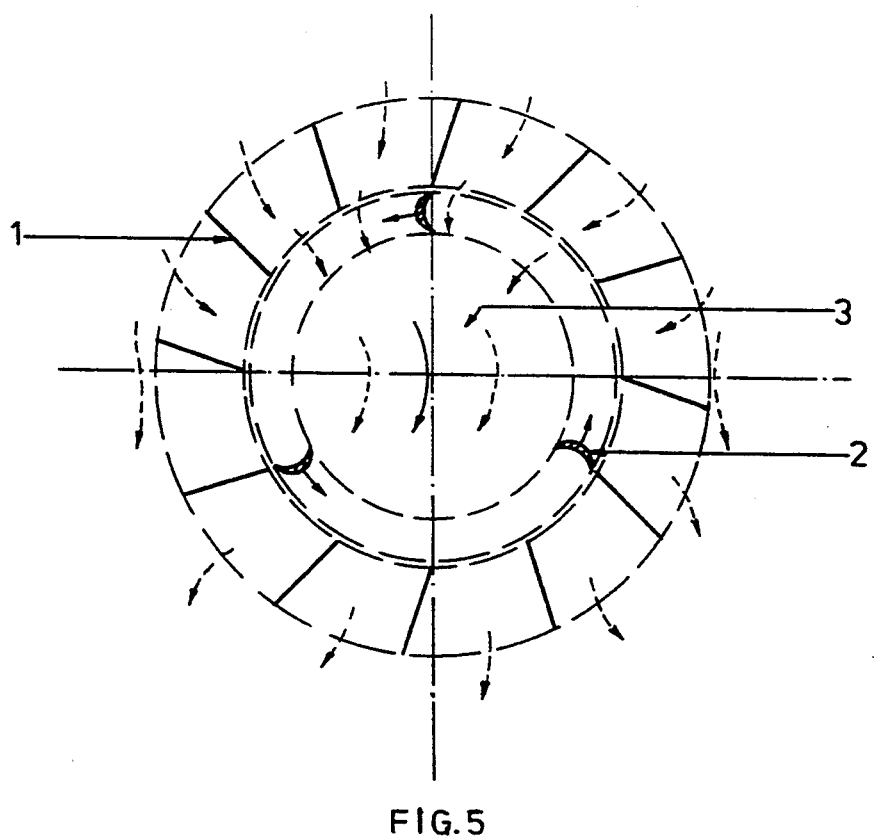
FIG. 5

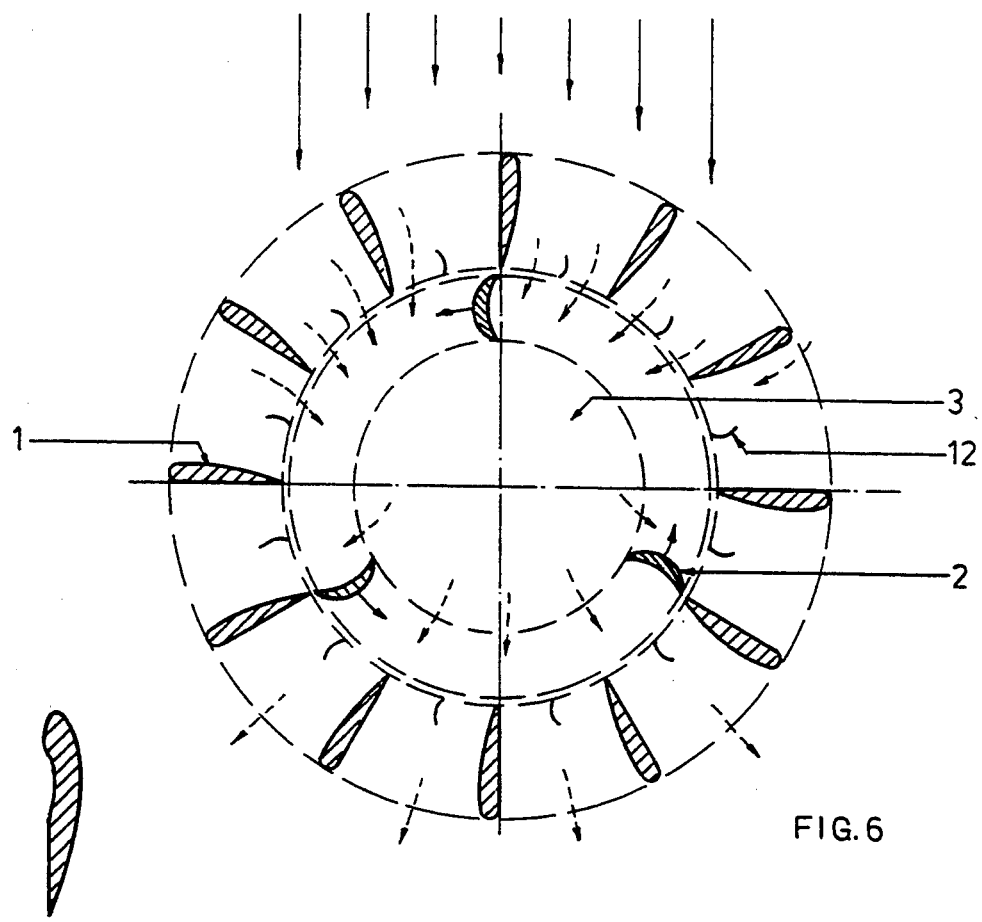
FIG. 6a
FIG. 6
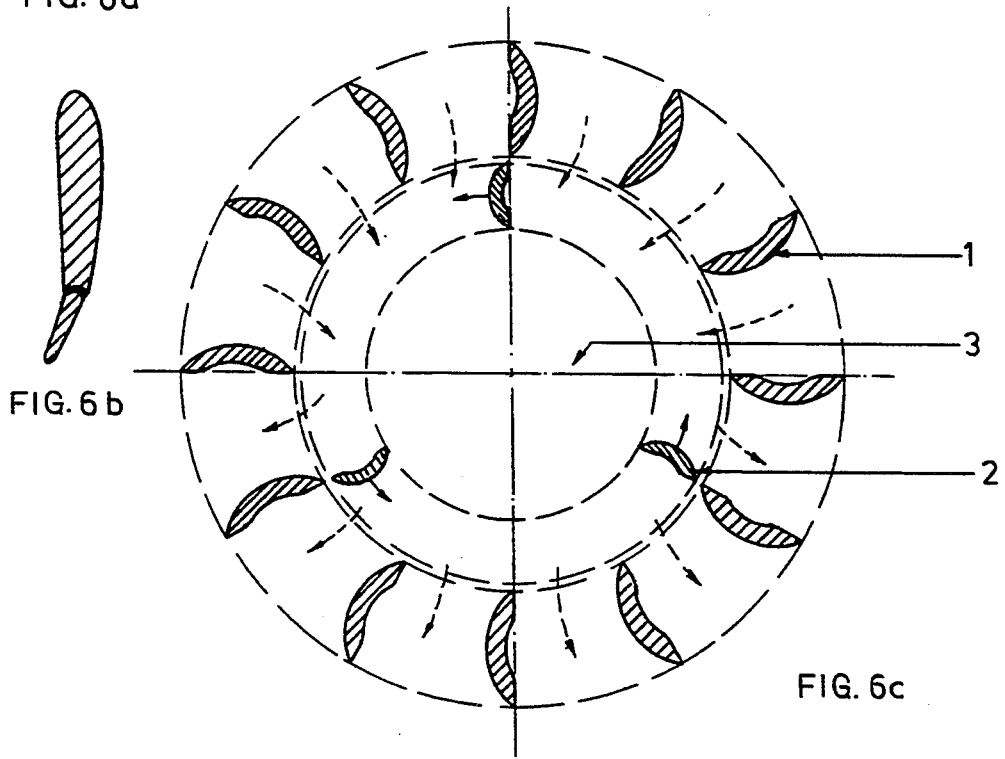
FIG. 6b
FIG. 6c

WIND TURBINE CROSS WIND MACHINE

THE BACKGROUND OF THE INVENTION

1. The Field of the Art

The present invention pertains to the field of the art of wind machines in general and in particular to the field of the wind turbine machines classified as either cross wind or vertical axis machines.

2. The Prior Art

Cross wind or vertical axis wind machines are generally known to be simpler to manufacture, whereas they moreover offer certain advantages when compared with wind machines of the horizontal type.

A first main inherent advantage of vertical axis wind machines is their ability to directly exploit the incoming wind independent of the direction at which it is blowing, without the assistance of orientation mechanisms of any type. This results to a lower manufacturing cost and a higher efficiency because of the simpler structure due to elimination of orientation mechanisms.

Another advantage exhibited by vertical axis wind machines is their ability to deliver the mechanical power produced at ground level, without employing complicated efficiency reducing mechanisms. Wind machines of the horizontal axis type would either necessitate complicated mechanisms such as bevel gears, elongated shafts, bearings or other transmission mechanisms or they would alternatively have to provide for mounting the electro-generator onto the wind mill tower, thereby loading the tower excessively and necessitating additional automation and wiring at a high level above the ground, which results in installation and maintenance difficulties. The elimination of such mechanisms in vertical axis wind machines renders a simple and cheaper construction, without the structural reinforcements otherwise necessary to support heavy machinery or mechanisms at certain heights, thereby leading to a further increase in the efficiency of the system.

Another advantage of vertical axis wind machines over the horizontal axis ones is their ability for a higher exploitation of the wind power, since their swept area in proportion to the ground occupied surface is by comparison larger.

Despite of their general superiority in comparison with horizontal axis wind machines, the vertical axis wind machines of the prior art also present certain drawbacks such as the relatively lower efficiency of the Savonius rotor and the additional inability of the Darrieus rotor machine to start by itself. The reason for the Savonius rotor exhibiting such a low efficiency is that the wind strikes on both sides of the rotor blades, i.e. the one following the wind direction and the other which counters it, thereby neutralizing part of the available wind force.

It is therefore the main object of the present invention to overcome the above drawbacks of vertical axis wind machines and provide a vertical axis wind machine, which will be capable of eliminating the counter acting impulse exerted by the wind on a certain portion of the rotor blades, whilst being capable of a maximum exploitation of wind power irrespective of the direction of the blowing wind, without necessitating any type of orientation mechanism, and furthermore providing self starting capabilities.

The above main object of the invention is accomplished by means of a wind turbine cross wind machine, which comprises an arrangement of guide vanes, circum-ferentially disposed around a centrally located rotor, these guide vanes being capable of maximally exploiting the wind, irrespective of the direction of its blowing, by forcing it to fall upon the rotor blades and positively assist in their direction of rotation without exerting any drag effect, which in the case of Savonius rotor is exerted by that portion of rotor blades rotating counter to the wind direction.

BRIEF DESCRIPTION OF THE DRAWINGS

The invention will become apparent to those skilled in the art by reference to the accompanying drawings, illustrating preferred embodiments of the invention.

FIG. 4 shows a planar cross sectional view of an alternative preferred embodiment of the proposed wind turbine, the guide vanes being shown with a curved cross section and also the rotor blades with an aerodynamical crescent shaped profile suitable for higher wind and rotor speeds.

FIG. 5 shows a planar cross sectional view of an alternative preferred embodiment of the proposed wind turbine, the guide vanes being of flat configuration and straight profile, their angle of declination being variable.

FIG. 5a shows a version of the above guide vanes in FIG. 5 being provided with articulated inner ends so as to form a 'fish hook' or 'J' type guide vanes, thereby allowing a smaller angle of declination for the straight part of the guide vanes and desirable controlling of the incoming airflow.

FIG. 6 shows a planar cross sectional view of an alternative preferred embodiment of the proposed wind turbine machine, the guide vanes being of a "wing type" airfoil profile flat on one side, and convex on the opposite side, with a variable angle of declination. Also the rotor blades are shown to be of the aerodynamicaly advantageous crescent shape.

FIG. 6a shows a version of the above 'wing' type guide vanes of FIG. 6, with concave front surface.

FIG. 6b shows a version of the above 'wing' type guide vanes of FIG. 6, being provided with articulated inner edge in the form of a tail fin to guide further the airflow.

FIG. 6c shows a planar cross sectional view of an alternative embodiment of the proposed wind turbine machine with guide vanes of a modified crescent shape with flat surfaces at the tips of the front faces, having the possibility to vary their angle of declination. The rotor blades shown are also of the same modified crescent type as the guide vanes.

Figure 1:
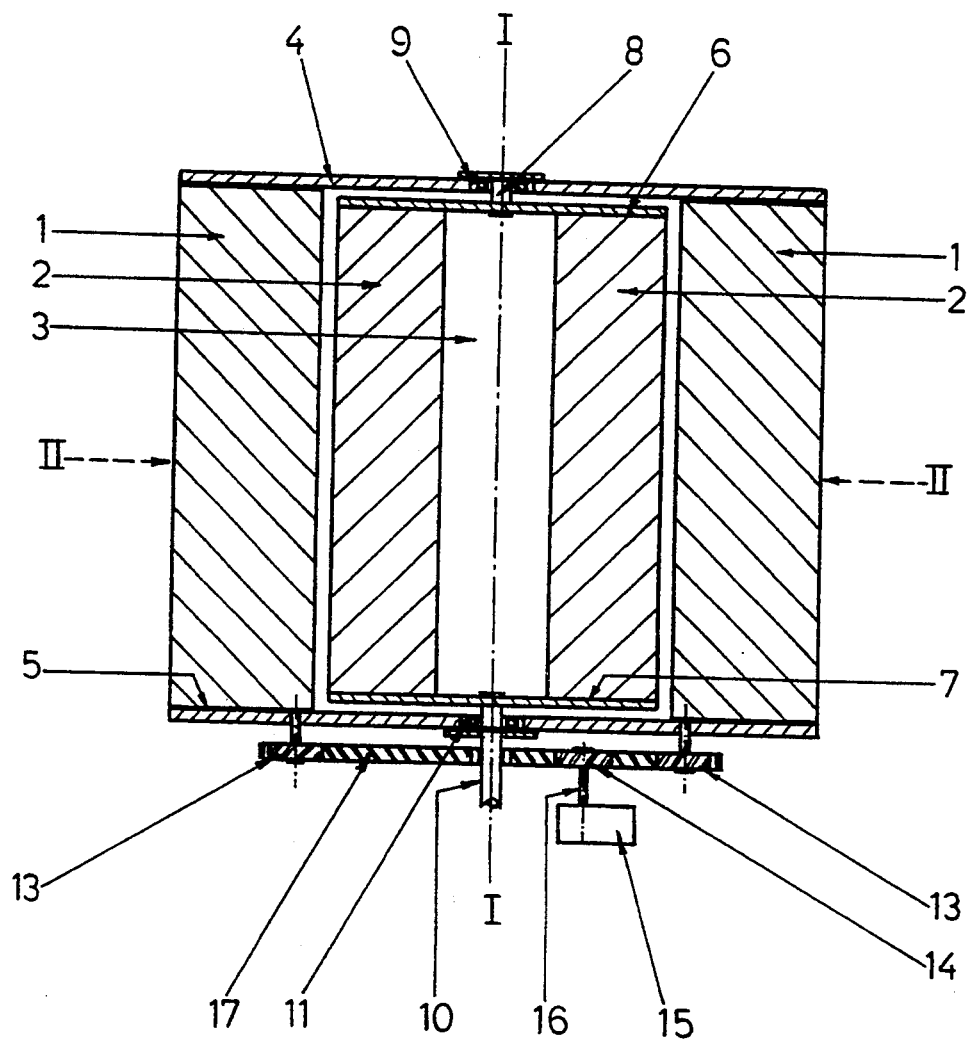
FIG. 1 shows a frontal view of a longitudinal section for a first preferred embodiment of the proposed wind turbine cross wind machine, taken along its central axis of rotation I—I.

The solid arrows indicate direction of motion for solid parts of the machine. The dotted arrows indicate airflows.

DESCRIPTION OF THE PREFERRED EMBODIMENTS

The proposed wind turbine machine comprises a rotor which is of a generally cylindrical shape formed by a plurality of blades 2, but preferably not exceeding twelve, equally and symmetrically spaced in a circumferential arrangement around a central circular opening or void space 3. The depicted blades 2 are shown to have a curved profile shape, which can be semicircular, elliptical, or other, the concave side of each blade being disposed at the same direction as its adjacent blades, around the circumference of the rotor. They are characterized by their upper and lower ends lying towards the upper or lower end of the cylindrical rotor, their inner or rear edge and outer or leading edge lying towards the inner or outer rotor circumference respectively, and also their front and rear face surfaces which form the sides of the blades facing towards the direction of the rotor motion or the one opposite to it respectively.

The proposed wind turbine cross wind machine further comprises, in accordance to the invention, a circumferential arrangement of a plurality of symmetrically and equally spaced, convergent towards the centre, guide vanes 1, preferably not exceeding sixteen, of straight profile and planar configuration, which define an external cylinder, enclosing the abovementioned arrangement of rotor blades 2. They are characterized in similar way as the rotor blades by upper and lower ends, inner and leading edges and front and rear faces.

Thus the working surface area of the proposed wind machine is defined by the product of the diameter and height of the abovementioned external cylinder.

In accordance to a first, illustrative preferred embodiment of the invention, the above mentioned longitudinally extending guide vanes 1 are fixedly mounted onto a circular base plate 5, whilst their top is covered by an upper head plate 4. Bearings are provided at the centre 9 and 11 of the base plate 5 and the head plate 4 respectively, within which rotates freely the rotor shaft in the form of stub shafts 8 and 10.

In the depicted embodiments of the invention the rotor is shown with a top circular disc cover 6 and a bottom equally circular disc cover 7, wherefrom extends the rotor shaft in the form of small cylindrical protrusions or stub shafts 8 and 10, and whereby the rotor assembly is rotatably mounted within top and bottom bearings provided at central openings 9 and 11 of both the head plate 4 and the base plate 5. Thus the rotor shaft and consequently the rotor central imaginary axis of rotation passes through the centre of the above mentioned central opening 3. The power produced by the proposed wind turbine machine is preferably delivered by a bottom extension of the rotor shaft-stub 10, working within the bearing of the base plate 5, thereby facilitating installation and maintenance of the necessary power transmission equipment.

In accordance to a preferred illustrative embodiment of the invention shown in FIG. 1, all plates namely head and base plates of the overall machine as well as top and bottom rotor discs, are flat, plain and compact without any openings therein, although they might alternatively comprise the compact region necessary for mounting the rotor shaft, or merely be perforated in their middle area so as to allow air passage from the spaces above and below the engine directly into the central rotor area if needed to equalize the low internal pressure of the engine with the ambient atmospheric one.

Figure 1A:
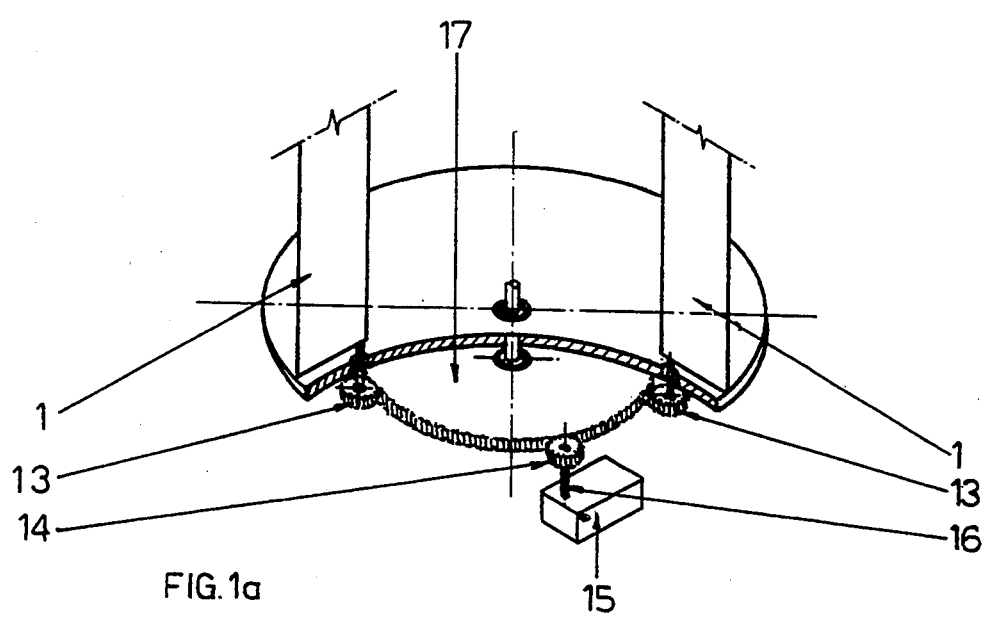
FIG. 1a shows a perspective view of an illustrative embodiment for a control mechanism used to vary the declination angle of the guide vanes mounted underneath the base plate 5 which is shown partially cut away to reveal the control mechanism.
Figure 1C:
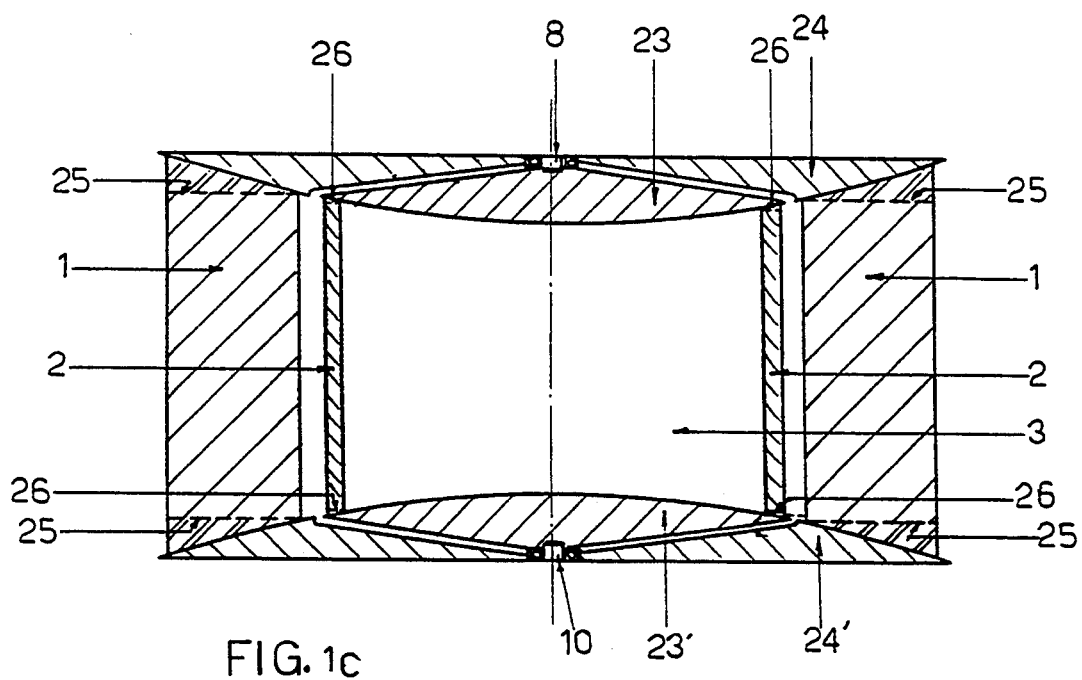
FIG. 1c shows a frontal view of a longitudinal section for an alternative preferred embodiment of the proposed wind turbine machine taken along the central axis of rotation, with arcuate internal upper and lower surfaces, symmetrically converging inwards at the machine centre, whereby a vertical concentration of the wind stream is achieved causing an increase of its velocity in application of the Bernoulli theorem.
Figure 1B:
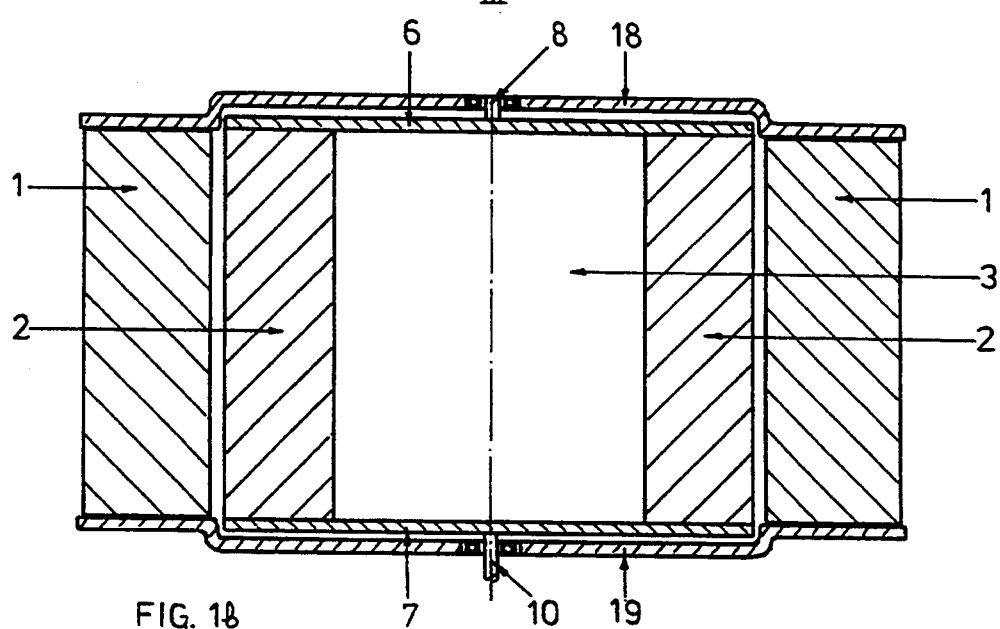
FIG. 1b shows a frontal view of a longitudinal section for an alternative preferred embodiment of the proposed wind turbine machine, taken along its central axis of rotation, the rotor top 6 and bottom 7 cover discs being contained flush into corresponding recesses of the upper (18) and base (19) support plates of the machine.

Furthermore, as shown in FIG. 1b, the wind turbine machine of the invention may alternatively comprise the head plate 18 and base plate 19, each plate being provided with a circular centrally positioned recess of an adequate diameter and depth so as to acommodate flush in its inner side the rotor top or bottom discs respectively. This arrangement would offer a smoother and more free air passage through the engine as it reduces the obstacles and the associated drag and turbulence caused by them.

An alternative configuration of engine plates and rotor discs is shown in FIG. 1c, where head 24 and base 24' plates are flat on their external sides supporting in their centre the rotor stub shafts 8 and 10 respectively. The inner surfaces of both pairs of plates and discs form a slightly curved profile, symmetrically converging verticalwise towards the centre of the machine, this curvature defining a continuous and uninterupted arc, except for the small gap between discs and plates, and whose edges meet the external plate sides. Each head and base plate bears in its inner curved surface a slightly conical circular recess, centrally disposed among the surrounding guide vanes 1, of an adequate diameter and depth to accomodate flush the rotor top 23 and bottom 23' discs respectively. This arrangement maximizes the air intake of the machine presenting a vertical application of the Bernouli effect. Lines 25 and 26 on the stator and rotor blade elements respectively denote that part of the blade lying between them which is articulated and can vary in angle of declination or incidence respectively.

Shown in FIG. 1a is a perspective view of an illustrative embodiment for a regulating mechanism used in adjusting at a desirable value the angle of declination ($\omega$) of the guide vanes. A side view of the mechanism also appears in FIG. 1. Each guide vane bears a small gear 13 meshing with a central toothed wheel 17, pivotally mounted onto the guide vanes base plate 5, by means of which the guide vanes may be rotated to perform airflow regulating function, a driving gear 14 also shown connected to a conventional electric actuator and electronic regulator device 15 by means of which movement of the guide vanes is initiated.

Figure 2:
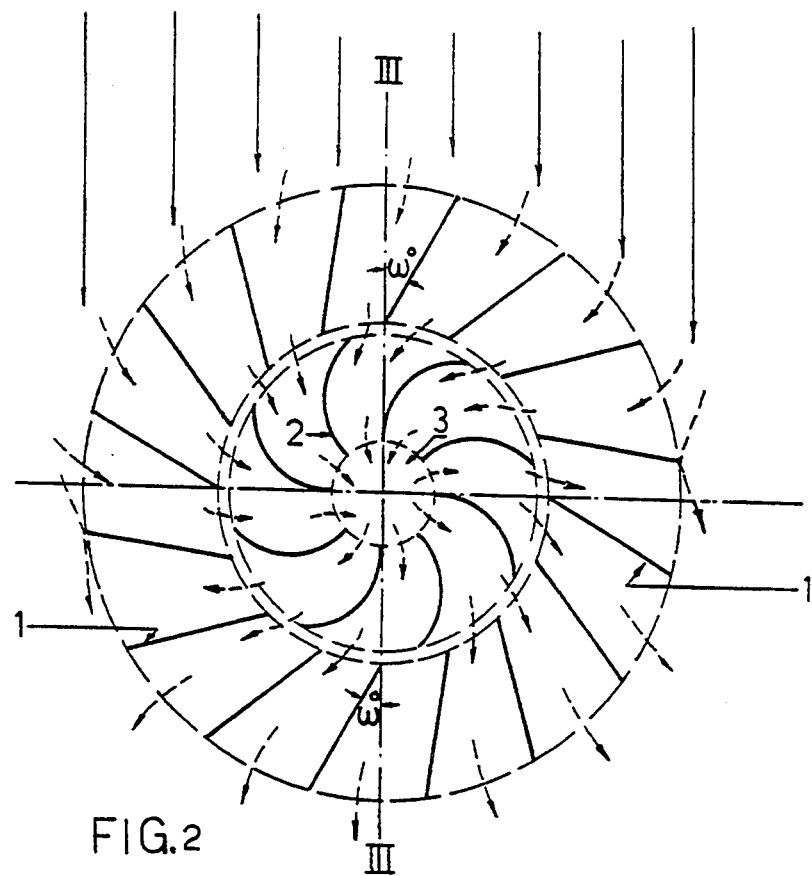
FIG. 2 shows a planar cross sectional view of the wind turbine machine of FIG. 1, taken along line II—II.

As depicted in FIG. 2, the plane of incidence of each guide vane forms an angle of declination ($\omega$) with the imaginary longitudinal plane passing from the central axis of rotation of the rotor III—III and the inner edge of each guide vane, and which bisects the whole engine into two semicylindrical portions. The First longitudinal plane III—III is the one which is parallel with the direction of the inciding wind and divides the engine into right and left sides as we look towards the wind flow.

The declination angle ($\omega$) for all guide vanes 1 is towards the same direction and it is the particular combination of the declination angle, width and spacing of the guide vanes which determines the ability of the latter, whatever the direction of the wind, to mask off the wind that side of the rotor which moves contrary to the direction of the wind and instead direct and guide the wind from this side towards the direction of rotor rotation, thereby eliminating the drag which is otherwise unavoidably exerted by this side of the rotor which moves contrary to the direction of the wind.

Thus, on the windward side of the engine the inciding wind is directed by the guide vanes towards the concave rear face of the rotor blades impelling them to rotate counter clockwise and then passing through the central opening 3 the airflux falls on the opposite lying rotor blades on their concave rear side as well, imparting them an additional thrust towards the same rotational direction and then gets exhausted from the leeward side expanding through the guide vanes lying on that side of the engine. Therefore all rotor blades contribute positively into its uniform rotational motion.

Figure 2A:
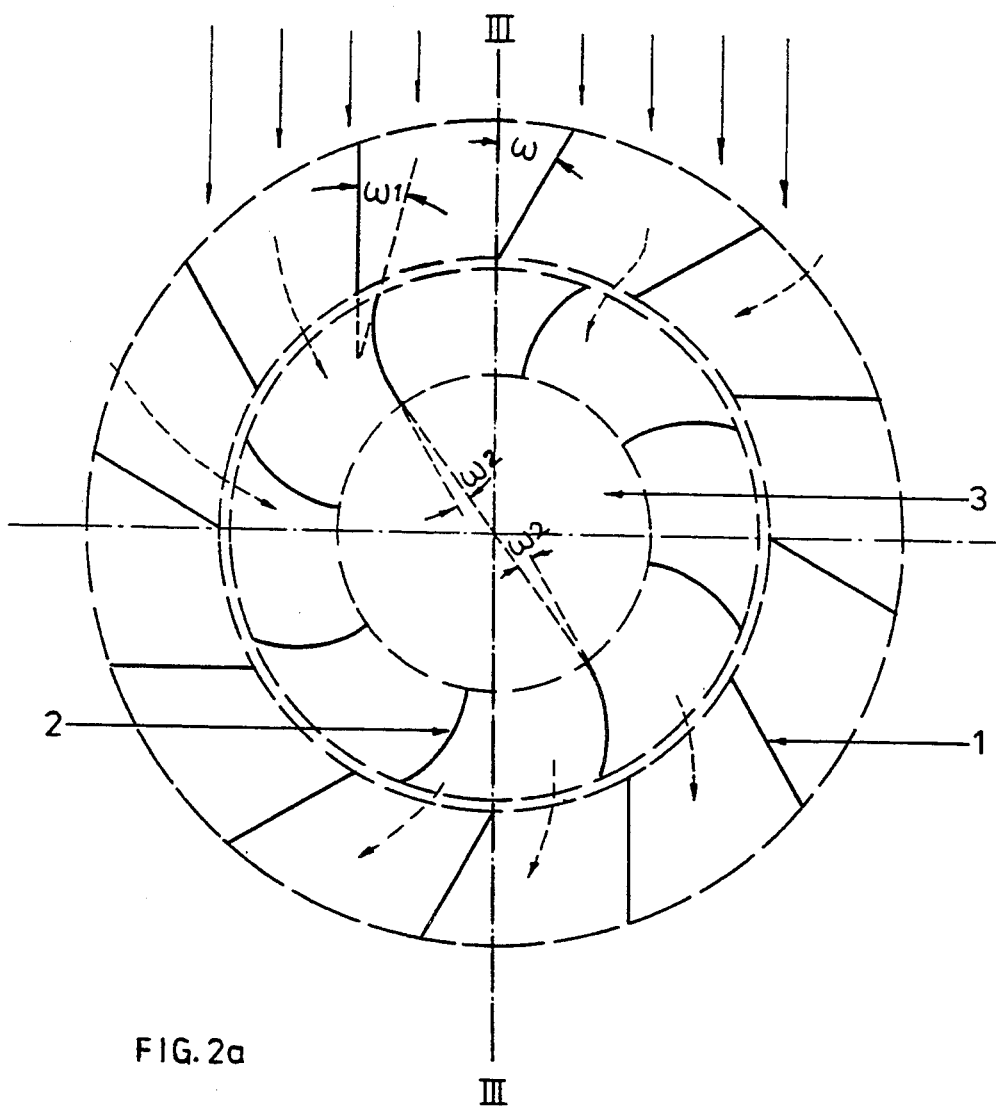
FIG. 2a shows a planar cross sectional view of an alternative preferred embodiment of the proposed wind turbine machine, the guide vanes and rotor blades are of a narrow profile width or of a short chord length respectively, allowing a wide central opening, this Figure demonstrating also angles ($\omega$), ($\omega 1$), ($\omega 2$).

Each of the above mentioned guide vanes has a predetermined width, with inner and leading edges, where the desired angle of declination is such that the guide vanes present a relative orientation with respect to the blowing wind which varies in accordance to their position on the periphery, commencing from a situation where guide vanes completely overlap each other and consequently offer total masking on that side of the rotor, where blades are moving contrary to the wind, then progressively this overlapping being reduced to reach the state where the rear concave sides of the rotor blades are exposed to direct wind force, then gradually extending further out to collect and guide additional air stream towards the rotor blades rear concave side thereby increasing the overall rotor momentum. It is evident that such desired angle of declination can vary as the width and/or spacing of the guide vanes is varied, but for operational reasons should not exceed 30 degrees. Thus, the bigger the angle of declination ($\omega$) the less is the required width for the guide vanes (or alternatively wider spacing between guide vanes can be allowed) to perform the abovementioned wind masking, this of course within certain limits dictated by the aerodynamic counteraction between incoming wind and guide vanes surface, which becomes unfavourable as the angle of declination increases. Again, for a smaller angle of declination, a greater width of the guide vanes would be necessary to obtain the necessary masking results, but then the wind friction on the guide vanes would be higher, though the aerodynamic counter action would be less instead and the working surface area of the machine would be bigger in proportion to the actual power producing area, that is the rotor working surface area. In other words the guide vanes would occupy relatively more space whereas the rotor diameter would diminish instead. (FIG. 2a). It is to be noted also the angle of incidence ($\omega 1$) which is formed by a plane of incidence tangential to the edge of a rotor blade in respect to any adjacent guide vane plane is kept to less than 30 degrees. Again, the angle of incidence ($\omega 2$) formed by a line tangential to the rear edges of two diametrically opposed rotor blades in respect with an axial plane passing through the central axis of rotation is kept less than 10 degrees.

In addition to the above, with their angled circumferential convergent towards the center arrangement, the guide vanes 1 act in a funnelling mode concentrating the incoming wind or dispersing the outgoing one within the stator segments which are formed between any two adjacent guide vanes and at the same time they act as a kind of vertical nozzles, inducing a linear infuser or diffuser action depending whether the corresponding stator segments lie on the windward or leeward side of the engine, this action increasing or decreasing the airstream speed accordingly.

Consequently and because of the above mentioned guide vanes' convergence, the linear infuser action on the flow by any windward stator segment pair is contained by a single rotor segment formed between two adjacent rotor blades and the infusion action is continued there in following a curved path causing a reversal or deflection of the air stream which actually constitutes the motive force of the rotor, then passing on into the central opening 3. Therefore both above mentioned stator and rotor segments form an infusion tunnel with gradually converging side walls, the grade of this convergence governed by the above mentioned declination angle ($\omega$), the angle of incidence ($\omega 1$) and the angle of incidence ($\omega 2$). Then, the air stream is conducted through to the central opening 3 onto the opposite leeward side corresponding similar arrangement of rotor and stator segments forming a reverse process airstream exhaust passage through a corresponding diffusion tunnel with gradually diverging side walls.

Therefore the engine is composed of sinuousoidal radially and symmetrically disposed successive compartments which include the common central opening in their midst, and which constitute the complete airpaths throughout the engine.

The central opening 3 of the rotor plays a two fold role, i.e. one of a simultaneously connecting and distributing chamber for the passing by airstream among the surrounding rotor segments. Thus, half of these rotor segments being on the windward side at a certain moment, they feed the central opening with fresh airstream and this in turn is passed on into the leeward side of the rotor segments. Therefore, the rotor segments as they turn around, they pass from the windward side of the machine to the leeward side and then back, this line of change-over being governed and dictated by the relative directions of the oncoming wind, the guide vanes angle of declination, and their spacing, as well as the shape and spacing of the rotor blades.

In accordance to a first preferred embodiment of the invention, the guide vanes are shown in FIGS. 2 and 5 with a flat profile, producing the masking effect by means of deviation of the wind stream employing the drag effect mostly as the wind is striking upon the side surfaces and alters its direction. Alternatively, the type of guide vane profiles shown in FIGS. 6, 6a, 6b, 6c, 7, and 7a deflect the airstream due to their particular shape and relative disposition within it inducing an aerodynamical interaction as they point their edges towards the airstream thereby causing the appearance of a lift effect, which ultimately imposes a change in the airstream direction.

All guide vanes may be of fixed or controlable declination angle which may be regulated for a desired efficiency and capacity. In this way the guide vanes might also be used as the speed regulating mechanism of the wind machine, even reaching the stage of completely shuting off the openings and thereby stopping the machine when required or when necessary e.g. to offer protection from extremely strong winds.

Figure 3:
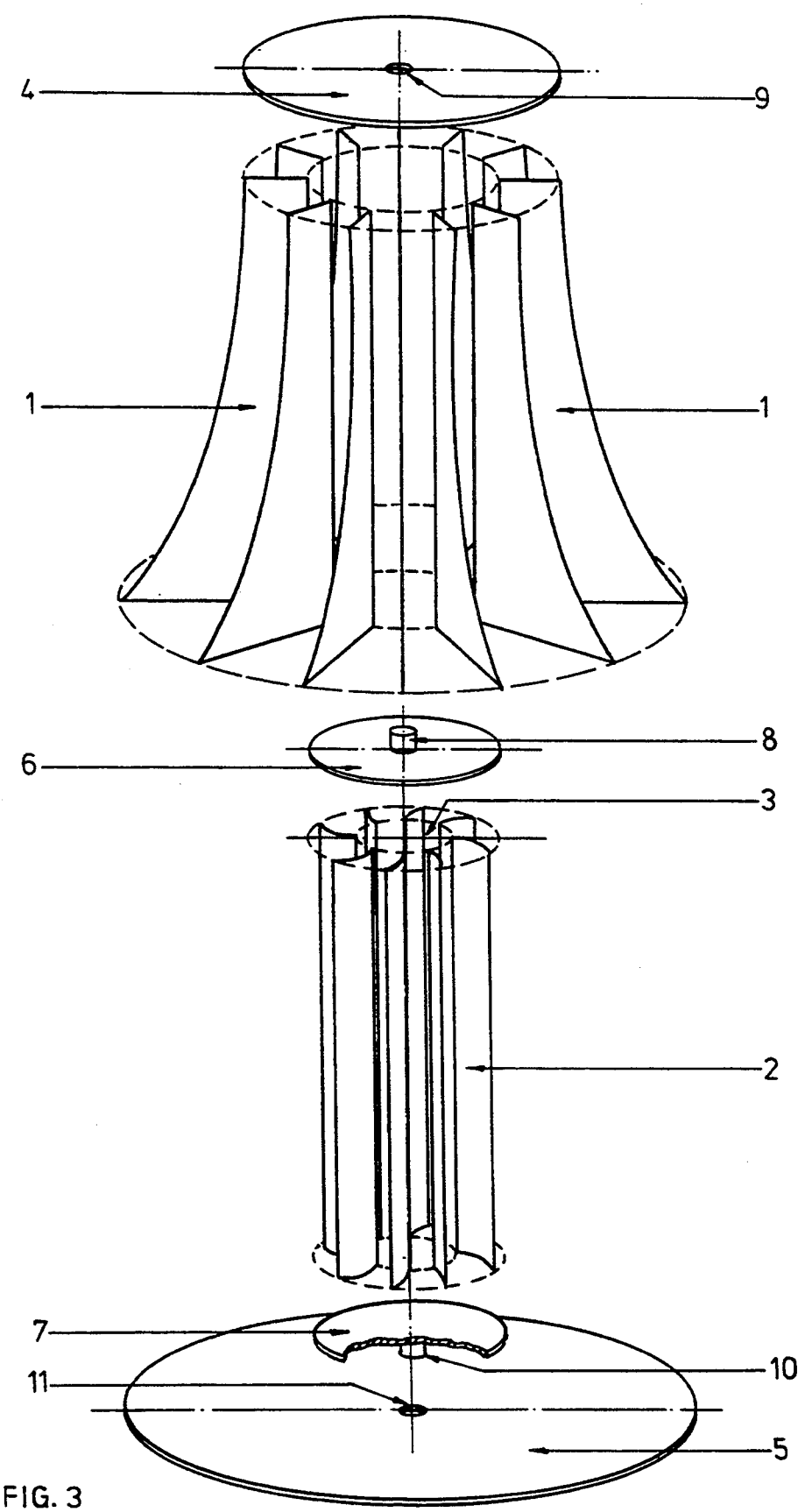
FIG. 3 shows a frontal blow-up view of the various constituent parts of an alternative preferred embodiment of the proposed wind turbine machine, with guide vanes longitudinally extending to a downward divergent conoidal shape.

In order to arrange for a uniform distribution of wind power lengthwise the employed rotor and since the wind velocity normally varies from a minimum in the proximity of the ground surface to a maximum at the upper top region of the machine, the guide vanes may be shaped in a manner such as to balance these natural irregularities, which might result to undesired effects in the operation of the machine. An illustrative arrangement of the guide vanes to fulfill this requirement is the conoidal shape as depicted in FIG. 3, showing a downward divergent parabolic external shape of guide vanes and the rest parts of the engine as well in an exploded view. In order to avoid excessive mechanical stresses on the structure and rotor oscillatory vibration problems, the ratio between the height of the engine to its external base diameter in this case should not exceed 1.

Although the proposed wind turbine machine is primarily designed to be used in a vertical arrangement, it may also assume any desired inclination if such a case arises. Furthermore, the same machine could be alternatively employed to function with a working medium other than air, such as steam or liquid and present similar advantages as described in the above.

This same concept may be applied with various configurations and combinations between different types of guide vanes and rotor configurations as well, so as to obtain certain particular advantageous characteristics. For example in FIG. 4 the guide vanes are shown with a curved profile, their chord line connecting their inner and leading edges having a length not exceeding one fifth of the engine overall diameter. Also, the rotor blades 2 are reduced in number merely three blades which could be augmented to eight depending on the machine diameter and the applicable wind speed to blade speed ratio. They are in the form of an aerodynamic crescent profile shape (resembling a moon quarter or half moon) suitable for higher wind and rotor speeds, their chords placed radially and symmetrically on the rotor periphery. They could be of variable angle of incidence controllable electronically or mechanically for maximum efficiency, but which for operational applications, should not exceed ±10 degrees in either direction from their original radial disposition so as to keep always their chords parallel with the apparent airflow across them. This kind of crescent shape could be alternatively employed for the guide vanes as well, disposed in way similar to that of the curved profile ones of FIG. 4, with their concave sides facing in a direction opposite to that of the adjacent rotor blades. They are of a symmetric type with concave or flat front surface and a convex rear one, their chord length not exceeding one fifth the engine diameter and their cross line length not exceeding half their chord. In FIG. 5 an example is shown of flat type narrow width guide vanes their width not exceeding one fifth of the engine overall diameter arranged circumferentially, so as to allow a wide internal space in their midst for smoother airflow and which guide vanes may be of variable declination angle and matched with rotor blades of the aerodynamic depicted crescent shape. These guide vanes may have an articulated inner end tail (FIG. 5a) like a ship rudder so as to form a "fish hook" type or "J" type guide vanes, permitting thus a smaller angle of declination for the straight leading part of the guide vanes, by controlling accordingly and additionally the incoming airflow.

In FIG. 6, an example is shown of wing type airfoil shape guide vanes placed circumferentially in a radial arrangement. Because of their winged airfoil shape being on one side flat and the opposite one curved, they divert the airflow in the direction of the rotor blades motion, even if they are not inclined in any angle of declination at all, and this is done with minimum turbulence. Their flat side faces towards a direction opposing the concave sides of the adjacent rotor blades and their chord length is not exceeding one fifth of the overall machine diameter, their cross line being one fourth to one seventh of the chord length. They may be of variable angle of declination which for operational applications could be swung ±10 degrees in either direction from their original radial disposition. The rotor blades 2 are of the aerodynamic crescent type profile.

Between the main guide vanes there may be placed circumferentially the auxiliary small guide vanes 12 to assist guiding the airflow allowing thus wider spacing between main guide vanes. They are radially disposed on the inner side of the main guide vanes periphery. These auxiliary guide vanes may be of flat, curved, crescent or airfoil profile either of the wing or the uniform symmetrical type, their width not exceeding half the width of the main ones.

Guide vanes 1 of the wing type airfoil shape are curved convex on the right rear side and flat or slightly concave on the left front side (FIG. 6a). In an alternative way they may be provided with a small rudder like tail fin for guiding further the air stream if necessary (FIG. 6b).

This same result could alternatively be achieved by means of guide vanes of the modified crescent type instead, as shown in FIG. 6c, which are characterized by partially flat front faces lying along the chord line, on the concave side close to both edges of the blades. They may be placed circumferentially and symmetrically around the rotor, their chords having a length not exceeding one fifth the overall engine diameter, their cross line being preferably confined between one fourth to one seventh of their chord length. They may be of variable declination angle in similar way as the above mentioned wing type ones. This type of profile could be employed for the rotor blades as well. In such a case, the chord length is less than one fifth the overall engine diameter, their cross line being 4 to 7 times smaller than their chord length. Their number may vary between two to eight such rotor blades placed radially on the rotor periphery, all facing towards the same direction around the periphery, with their concave sides in a direction opposite to that of the adjacent guide vanes respectively, the operating conditions remaining the same as for the crescent type rotor blades ($\pm 10$ degrees swinging from their radial position so as to keep their chords always parallel with the fluid flow therethrough).

Figure 7:
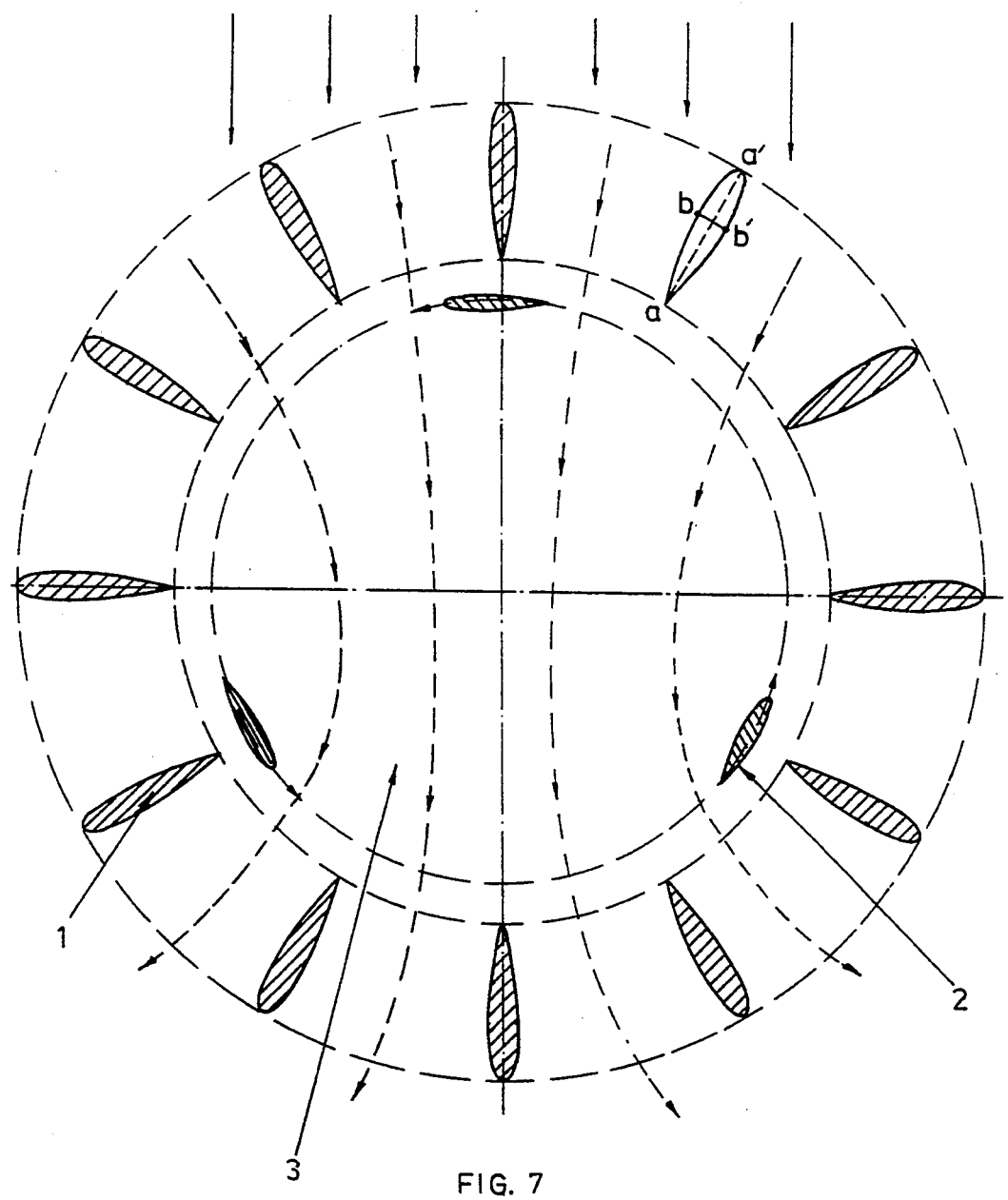
FIG. 7 shows a planar cross sectional view of an alternative preferred embodiment of the proposed wind turbine machine, both the guide vanes and the rotor blades being of symmetrical airfoil type with variable angle of declination and angle of incidence respectively. Chord line a—a' and cross line b—b' for the airfoil profile are illustratively defined in one of the depicted guide vanes.

FIG. 7 shows an example of the wind turbine machine with uniform airfoil guide vanes 1, whose both front and rear sides are curved symmetrically in a convex profile, having an outer curved edge and an inner acute edge, placed circumferentially around the rotor in a radial arrangement symmetrically and equally spaced. Their total number may vary between ten and fifteen. In an exemplary way, a chord line a—a' is shown connecting the edges of the airfoil profile of one of the guide vanes, chord being defined as the straight line between the ends of an arc. The cross line b—b' is the perpendicular line to the chord between the side surfaces of the airfoil at their thickest point.

The uniform airfoil guide vanes due to their shape and disposition divert the airflow with minimum turbulence employing the lift effect and thereby minimizing power losses, in a uniform way for both sides of the airflux creating a symmetrically concentric air stream passing through the engine and a balanced masking effect for both sides of the machine. Therefore, this type of machine presents a venturi behaviour and qualifications this effect being demonstrated in the horizontal plane or in a sense perpendicular to the axis of rotation and initiated by the guide vanes being disposed symmetrically and forming an elongated diffuser machine inlet or outlet between each adjacent pair of them. The chord line of these guide vanes varies preferably between one fourth to one seventh of the overall machine diameter.

With this kind of symmetrically arranged airflow it is made possible and preferable to use rotor blades of the symmetric airfoil type being suitable for high speeds too. Two to eight such rotor blades symmetrically disposed occupy a tangential position on the rotor periphery as shown in FIG. 7. They are characterized by a front curved edge towards the direction of rotation and a rear acute edge in the opposite direction, inner and outer sides facing towards the central or the external parts of the engine respectively, and their upper and lower ends which are mounted fixedly or rotatable onto the top and bottom rotor discs. The chord line length of each rotor blade is preferably less than one fifth of the overall engine diameter, said chord line being four to seven times longer than the cross line of the respective airfoil profile. Also, due to the particular arrangement of the guide vanes creating the aforesaid airstream pattern, the rotor blades as disposed relatively act with their chords perpendicular to the passingby airstream during their entire cycle of rotation, this arrangement holding good for both sides of their airfoil profile, this constituting a basic feature in this type of engine.

The declination angle of the above guide vanes may be varied to control the air flow if needed, but for operational applications this regulation need not be more than $\pm 10$ degrees in either direction from their original radial disposition. Similarly, variation of the incidence angle may also be applied to the rotor blades for regulating or feathering purposes to stop the machine whenever needed.

In this case also the rotor blades of the aerodynamic crescent type or the modified one could be used as well, in the maner extended before.

Figure 7A:
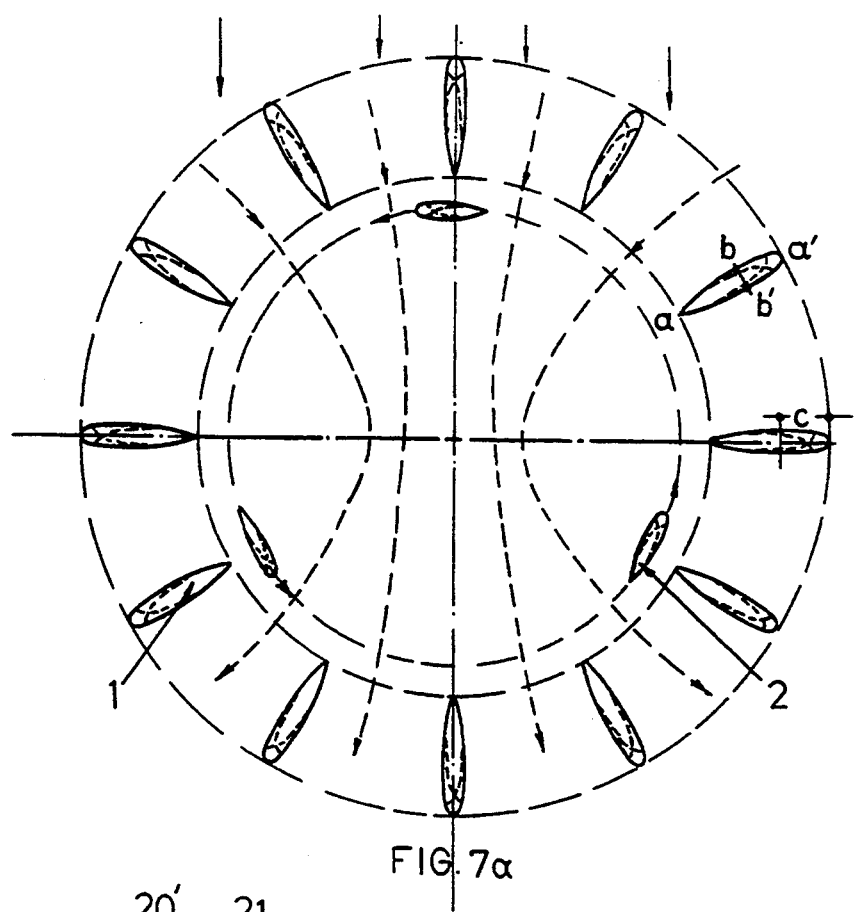
FIG. 7a shows a planar cross sectional view of an improved version of the wind turbine machine of FIG. 7, with air passages 20 & 20' connecting the high pressure areas on the outer surface of the front part of the guide vans and rotor blades with the low pressure areas developed during operation on the outer surfaces of their rear part. Distance -c- is also shown being the chord length between the cross line and the front edge of a blade or vane.

FIG. 7a shows an improved version of the wind machine appearing in FIG. 7, employing pairs of air passages or ducts (20 & 20') inside the guide vanes and the rotor blades, forming paths of symmetrical profile but of an opposing sense, each such duct 20 or 20' connecting the frontal external sides of the blades, where the inciding airstream forms regions of high pressure, with the opposite lying sides of low pressure regions towards their tails.

These air passages perform a twofold action, one to equalize pressure differences along the external sides of the guide vane or rotor blade elements reducing the drag exerted upon them and second, to exploit that part of the airstream passing through them to produce more propelling thrust for the rotor blades or reduce vortices and form a streamlined and power producing flow for the guide vanes. Their action is maximum when the central line -d- through ducts 20 or 20' (FIG. 7b) at the intake of the air passages is parallel to the direction of the apparent airflow and gets minimum when the airflow direction is perpendicular to this intake central line, as for example is the case when the guide vanes chord is parallel with the airflow. The angle formed in the horizontal plane between the central line of the air passage intake in respect to the chord line should not be less than 20 degrees and not more than 70 degrees, as measured from the front side, this relative angle being dictated by the desired or foreseen interaction between the apparent flow and the blade element.

Figure 7B:
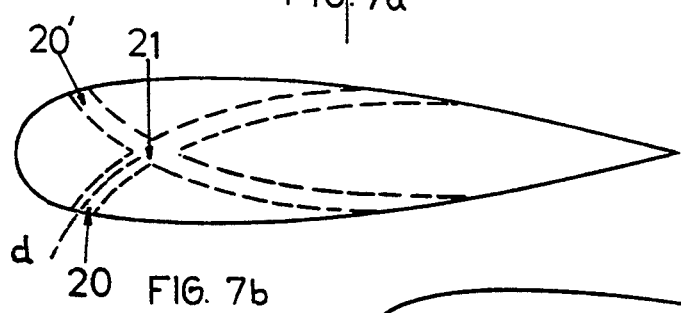
FIG. 7b is a detailed planar cross sectional view of a single guide vane or rotor blade of FIG. 7a with a pair of single ducted air passages, these air passages crossing each other at a common junction point along their length.
Figure 7D:
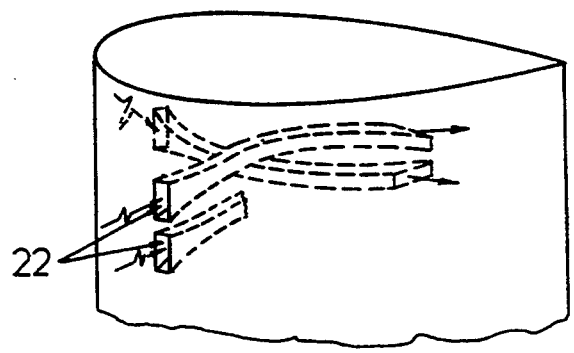
FIG. 7d shows a perspective view for air passages in a guide vane or rotor blade element crossing each other on different levels with vertically funneling air duct intakes.
Figure 7C:
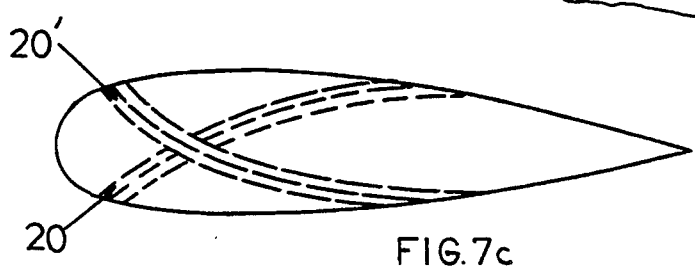
FIG. 7c is a detailed planar cross sectional view of a single guide vane or rotor blade of FIG. 7a with a pair of twin ducted air passages crossing each other on different levels.

The pairs of air passages maybe of the single duct type depicted in FIG. 7b wherein one duct commences from an air intake in the frontal region of the vane or blade element in front of the cross line, and the other duct commences from a similar air intake on a symmetrically opposite side of the same front part, then crossing the opposite duct through a common junction (21), each duct then continuing its path which maybe arcuate or eliptical in profile, towards the opposite side at the aft part of the element behind the cross line where the airflow is discharged in a direction parallel to the chord of the said vane or blade element. These ducts may extend throughout the entire height of the respective guide vane or blade elements interrupted only by the necessary interposed connecting and reinforcing elementary required laminar frames arranged in a lateral direction. Their width should not exceed one third the cross line length, otherwise double or even multifold duct system should be employed, the second duct running paralel and adjacent to the first one as shown in FIG. 7c, or even further apart but always commencing in front of the cross line and terminating behind it. In this case it is preferable the two opposite side airpassages to cross over on different successive vertical levels isolated from each other and dividing between them the whole height of the blade element. This can be achieved by using ducts of constant cross sectional area throughout their length but of variable height and width in inverse proportions in respect to each other, commencing from a lowest height at the crossing over point and where there is their widest part, then progressively funelling verticalwise, the duct height augmenting towards their ends upto the intakes and exhausts respectively, their width narrowing accordingly so the product of height and width is kept constant or almost constant. Alternatively, ducts of constant dimensions throughout their length could be used spaced enough apart in vertical level to allow for crossing over each other, but then the air intake would be reduced. This could be compensated upto a certain extent by allowing more width for the ducts.

Concluding, the first versions of this concept namely those appearing in FIGS. 2, 3, 4, 5, 6 and 6c could be characterized as vortex effect applying machines, since their structure is such so as to produce a circular airpath deflection out of the more or less straight inpinging windstream and then using that unidirectional airpath formed inside the engine to convert wind power into mechanical momentum on the rotor shaft. Alternatively, the latter engine versions appearing in FIG. 7 and 7a, by inducing twin horizontal airpaths symmetrically convergent towards the middle of the engine is acting like an aerodynamic lens and a venturi effect appears across the rotor blades in the horizontal plane or the plane perpendicular to the rotor axis, this constituting a distinctive characteristic of this engine type. It must hereby be noted that the present description was made by reference to illustrative embodiments. The specific design as to selected forms, shapes, dimensions, materials and accessories used in the manufacturing and assembly process, as well as any change or amendment in the above, as long as they do not constitute a new inventive step, are considered part of the scope and aims of the present patent application.

I claim:

1. A cylindrical turbine machine for generating power by the rotation of a generally cylindrical rotor which is rotated about an elongated axis by a fluid stream moving relative to the rotor, comprising, a first number of generally equally spaced fluid guide vanes having front and rear surfaces, inner and outer elongated edges and upper and lower ends, a second number of elongated rotor blades which are generally equally spaced around the periphery of the rotor and having inner and outer elongated edges, front and rear surfaces and upper and lower ends, said first number of guide vanes being greater than said second number of rotor blades, said rotor blades being mounted at their upper and lower ends to a first pair of opposing upper and lower plate means, the rotor having a central area defined between said first pair of upper and lower plate means and centrally of said rotor blades, said central area forming a cylindrical space between said rotor blades, said rotor blades defining open passageways for directing fluid generally centrally of and through said open cylindrical space, said guide vanes being oriented in surrounding relationship to said rotor blades, said upper and lower ends of the guide vanes being carried by a second pair of opposing upper and lower plate means, means for rotatably mounting said first pair of plate means relative to said second pair of plate means so that the rotor is rotatable with respect to said guide vanes, at least first and second fluid flow ducts through each of said guide vanes and said rotor blades, each of said first fluid flow ducts extending between an inlet in said front surfaces of said guide vanes and said rotor blades and adjacent the outer edges thereof to an outlet in said rear surfaces adjacent said inner edges thereof, and said second fluid flow ducts extending from an inlet in said rear surface of said guide vanes and said rotor blades adjacent said outer edges through to an outlet in said front surface adjacent said inner edges thereof.

2. The turbine machine of claim 1 in which said rotor blades are oriented so that said front and rear surfaces thereof converge in an arcuate manner relative one another toward said inner edges thereof so that said open passageways are curved, said guide vanes being oriented at a declining angle of not greater than 30 degrees relative to a vertical plane extending through and along the elongated axis of the rotor and which is aligned to intersect the inner edge of a respective guide vane, a first angle of incidence of not greater than 30 degrees being created between a vertical plane extending outwardly from said outer edge of each rotor blade and an aligned adjacent guide vane, and a second angle of incidence of not greater than 10 degrees is created between a vertical plane extending tangentially relative to said inner edges of said rotor blades and a vertical plane extending through and along the elongated axis of the rotor and intersecting the inner edge of a respective rotor blade.

3. The turbine machine of claim 2 including means for adjusting the orientation of said guide vanes relative to said rotor blade.

4. The turbine machine of claim 3, characterized in that said guide vanes are generally of an arcuate cross section having front concave surfaces and wherein the length of a chord distance between said outer to said inner edges of each of said guide vanes is less than one fifth of the overall machine diameter, and said front concave surface of each guide vane facing opposite to the front surface of an adjacent rotor blade.

5. The turbine machine of claim 1, characterized in that each of said rotor blades is of a uniform symmetrical crescent shape having pointed angular inner and outer edges, a convex front surface and a concave rear surface, said front and rear surfaces defining arcs which meet at said inner and outer edges but are separated at their middlemost spaced point by a cross line distance not exceeding one half of a straight line chord taken between the inner and outer edges of said rotor blades, said chord having a length not more than one fifth of the overall machine diameter, and means for adjusting an angle of incidence of said rotor blades, relative to said vertical plane extending through and along the elongated axis of the rotor and which intersects the inner edge of a respective rotor blade, ±10 degrees.

6. The turbine machine of claim 5 in which at least a portion of said front surfaces of said guide vanes are generally planar and said rear surfaces are generally concave, said outer edges of said guide vanes being curved and said inner edges thereof being angularly pointed, and means for adjusting an angle of incidence of said rotor blades, relative to said vertical plane extending through and along the elongated axis of the rotor and which intersects the inner edge of a respective rotor blade, ±10 degrees.

7. The turbine machine of claim 1 in which each of said rotor blades has a modified crescent-shaped cross-sectional configuration including a generally convex front surface and at least portion of said rear surface being planar, each of said guide vanes having a modified crescent-shaped cross section including a generally convex rear surface and at least a portion of said front surface being planar, said guide vanes being generally radially oriented relative to the elongated axis, said rear surfaces of said rotor blades including a concave portion intermediate planar portions adjacent said inner and outer edges thereof, a plurality of auxiliary guide vanes, said auxiliary guide vanes being spaced intermediate said guide vanes and having inner and outer edges and front and rear surfaces, said auxiliary guide vanes having dimension taken between said inner and outer edges which is not greater than one half of a distance taken between said inner and outer edges of said guide vanes.

8. The turbine machine of claim 1 in which at least two of said fluid flow compartments are in open communication with an adjacent fluid passageway between adjacent rotor blades at all times.

9. The turbine machine of claim 1, characterized in that said first pair of upper and lower plate means includes a pair of stub shafts, each said stub shaft extending outwardly from a central portion of said first pair of plate means so as to be aligned with said elongated axis, bearing means for rotatable supporting said stub shafts, said second pair of plate means having faces which oppose one another, a recess in each of said faces, said first pair of plate means being centrally and rotatably mounted within said recesses, said first pair of plate means including curved inner opposing surfaces symmetrically converging towards the elongated axis, said second pair of plate means including tapered annular wall portions surrounding each of said recesses, and said wall portions and said inner opposing surfaces of said first pair of plate means defining a generally continuous arc.

10. The turbine machine of claim 1 in which said outer edges of said guide vanes flare outwardly from said upper to said lower ends thereof so that the surface area of said front surface thereof is greater adjacent said lower ends than adjacent said upper ends thereof.

11. The turbine machine of claim 1 in which said first and second fluid flow ducts intersect with one another within said guide vanes and said rotor blades.

12. The turbine machine of claim 1 including a plurality of first and second fluid flow ducts vertically spaced along at least said guide vanes.

13. A cylindrical turbine machine for generating power by the rotation of a generally cylindrical rotor which is rotated about an elongated axis by a fluid stream moving relative to the rotor, comprising, a first number of generally equally spaced fluid guide vanes having front and rear surfaces, inner and outer elongated edges and upper and lower ends, a second number of elongated rotor blades which are generally equally spaced around the periphery of the rotor and having inner and outer elongated edges, front and rear surfaces and upper and lower ends, said first number of guide vanes being greater than said second number of rotor blades, said rotor blades being mounted at their upper and lower ends to a first pair of opposing upper and lower plate means having a diameter generally equal to the rotor periphery diameter, the rotor having an open central area defined between said first pair of upper and lower plate means and centrally of said rotor blades, said central area being unobstructed and forming an open cylindrical space between said rotor blades having a diameter not less than one sixth of the overall diameter of the turbine machine, said rotor blades defining open passageways for directing fluid generally centrally of and through said open cylindrical space, said guide vanes being oriented in surrounding relationship to said rotor blades, said upper and lower ends of the guide vanes being carried by a second pair of opposing upper and lower plate means, means for rotatably mounting said first pair of plate means relative to said second pair of plate means so that the rotor is rotatable with respect to said guide vanes, said guide vanes being oriented so that said front and rear surfaces of adjacent vanes converge relative to one another toward said inner edges thereof so as to form wedge-shaped fluid flow compartments, pairs of said fluid flow compartments and said passageways being aligned on opposite sides of the machine to thereby create inlet and outlet flow paths which are in communication through said central area to thus define fluid passageways throughout the machine, said guide vanes being disposed generally radially with respect to the elongated axis and having a generally uniform symmetrical airfoil cross section defined by front and rear arcuate surfaces, said outer edge of each guide vane being curved and said inner edges being pointed, at least first and second fluid flow ducts through each of said guide vanes and said rotor blades, each of said first fluid flow ducts extending between an inlet in said front surfaces of said guide vanes and said rotor blades and adjacent the outer edges thereof to an outlet in said rear surfaces adjacent said inner edges thereof, and said second fluid flow ducts extending from an inlet in said rear surface of said guide vanes and said rotor blades adjacent said outer edges through to an outlet in said front surface adjacent said inner edges thereof.

14. The turbine machine of claim 13 in which said rotor blades having a uniform symmetrical airfoil type cross section similar to said guide vanes, each of said rotor blades having a chord length between said inner and outer edges not greater than one fifth of the overall machine diameter with such chord length being 4 to 7 times longer than a cross line length taken perpendicular to the chord length at the point of greatest dimension between said front and rear surfaces thereof, and each of said guide vanes having a chord length between said inner and outer edges of between one fourth and one seventh of the overall machine diameter and a cross line taken perpendicular to the chord length at the point of greatest dimension between the front and rear surfaces thereof of between one fourth to one seventh of said chord length.

15. The turbine machine of claim 13 in which said rotor blades are oriented generally tangentially to said elongated axis, and said outer edges proceed said inner edges in the direction of rotation of said rotor.

16. The turbine machine of claim 13 in which said first and second fluid flow ducts intersect with one another within said guide vanes and said rotor blades.

17. The turbine machine of claim 13 including a plurality of first and second fluid flow ducts vertically spaced along at least said guide vanes.

18. A cylindrical turbine machine for generating power by the rotation of a generally cylindrical rotor which is rotated about an elongated axis by a fluid stream moving relative to the rotor, comprising, a first number of generally equally spaced fluid guide vanes having front and rear surfaces, inner and outer elongated edges and upper and lower ends, a second number of elongated rotor blades which are generally equally spaced around the periphery of the rotor and having inner and outer elongated edges, front and rear surfaces and upper and lower ends, said first number of guide vanes being greater than said second number of rotor blades, said rotor blades being mounted at their upper and lower ends to a first pair of opposing upper and lower plate means having a diameter generally equal to the rotor periphery diameter, the rotor having an open central area defined between said first pair of upper and lower plate means and centrally of said rotor blades, said central area being unobstructed and forming an open cylindrical space between said rotor blades having a diameter not less than one sixth of the overall diameter of the turbine machine, said rotor blades defining open passageways for directing fluid generally centrally of and through said open cylindrical space, said guide vanes being oriented in surrounding relationship to said rotor blades, said upper and lower ends of the guide vanes being carried by a second pair of opposing upper and lower plate means, means for rotatably mounting said first pair of plate means relative to said second pair of plate means so that the rotor is rotatable with respect to said guide vanes, said guide vanes being oriented so that said front and rear surfaces of adjacent vanes converge relative to one another toward said inner edges thereof so as to form wedge-shaped fluid flow compartments, pairs of said fluid flow compartments and said passageways being aligned on opposite sides of the machine to thereby create inlet and outlet flow paths which are in communication through said central area to thus define fluid passageways throughout the machine, at least first and second fluid flow ducts through each of said guide vanes and said rotor blades, each of said first fluid flow ducts extending between an inlet in said front surfaces of said guide vanes and said rotor blades and adjacent the outer edges thereof to an outlet in said rear surfaces adjacent said inner edges thereof, and said second fluid flow ducts extending from an inlet in said rear surface of said guide vanes and said rotor blades adjacent said outer edges through to an outlet in said front surface adjacent said inner edges thereof.

* * * * *